Jan. 20, 1925.
G. H. GIBSON
1,523,414
COMBUSTION CONTROL FOR GAS PRODUCERS
Original Filed May 28, 1917    3 Sheets-Sheet 1
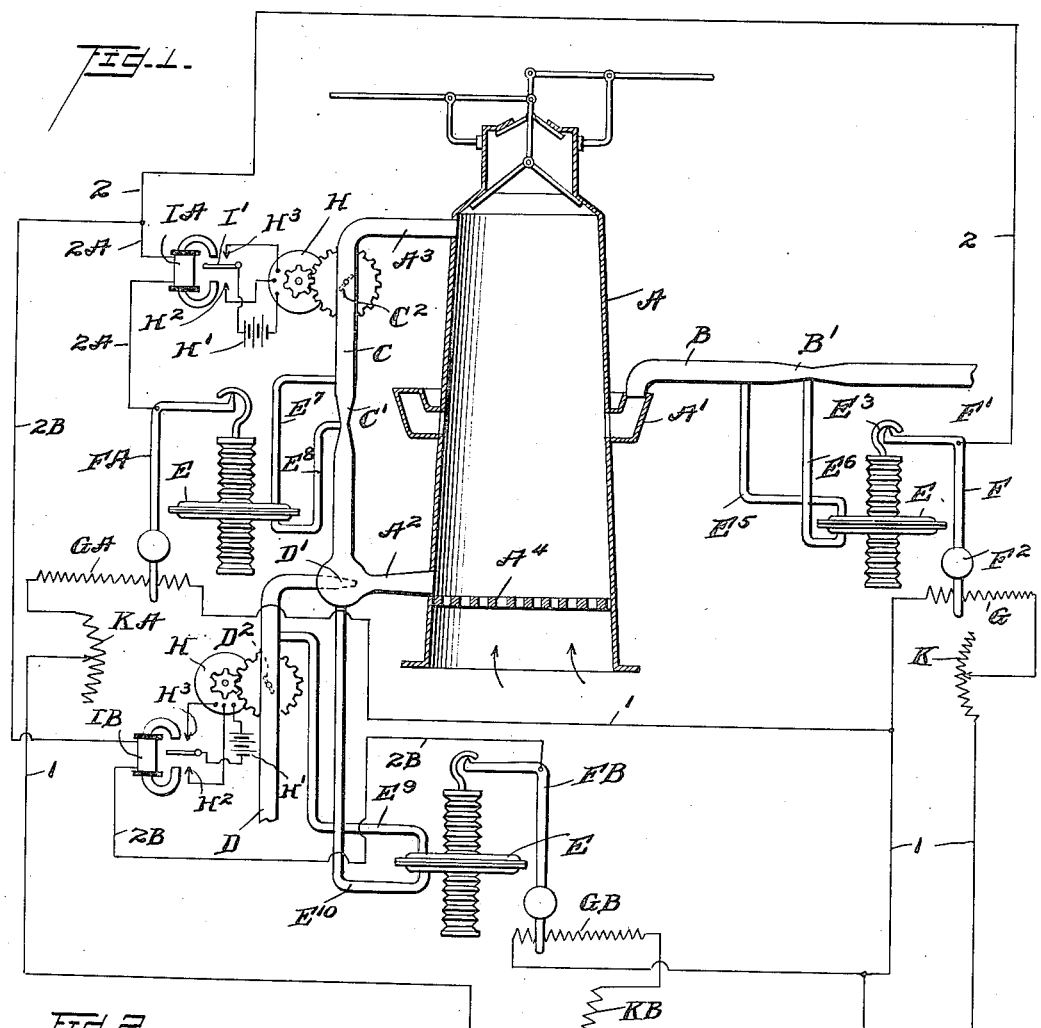
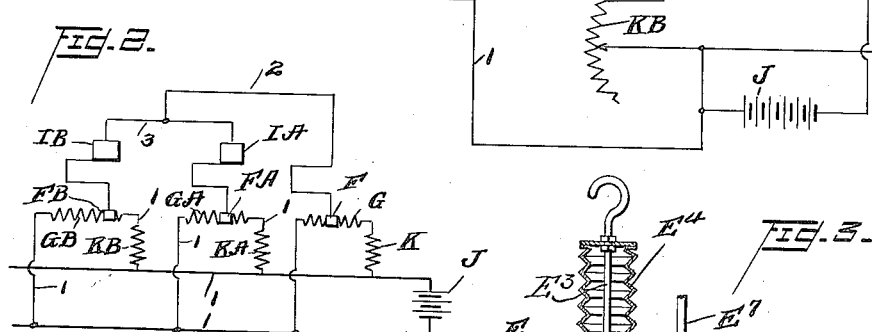
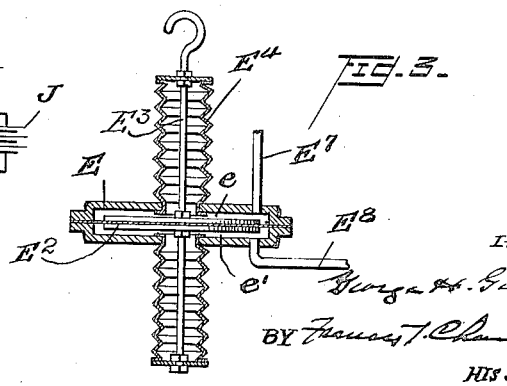

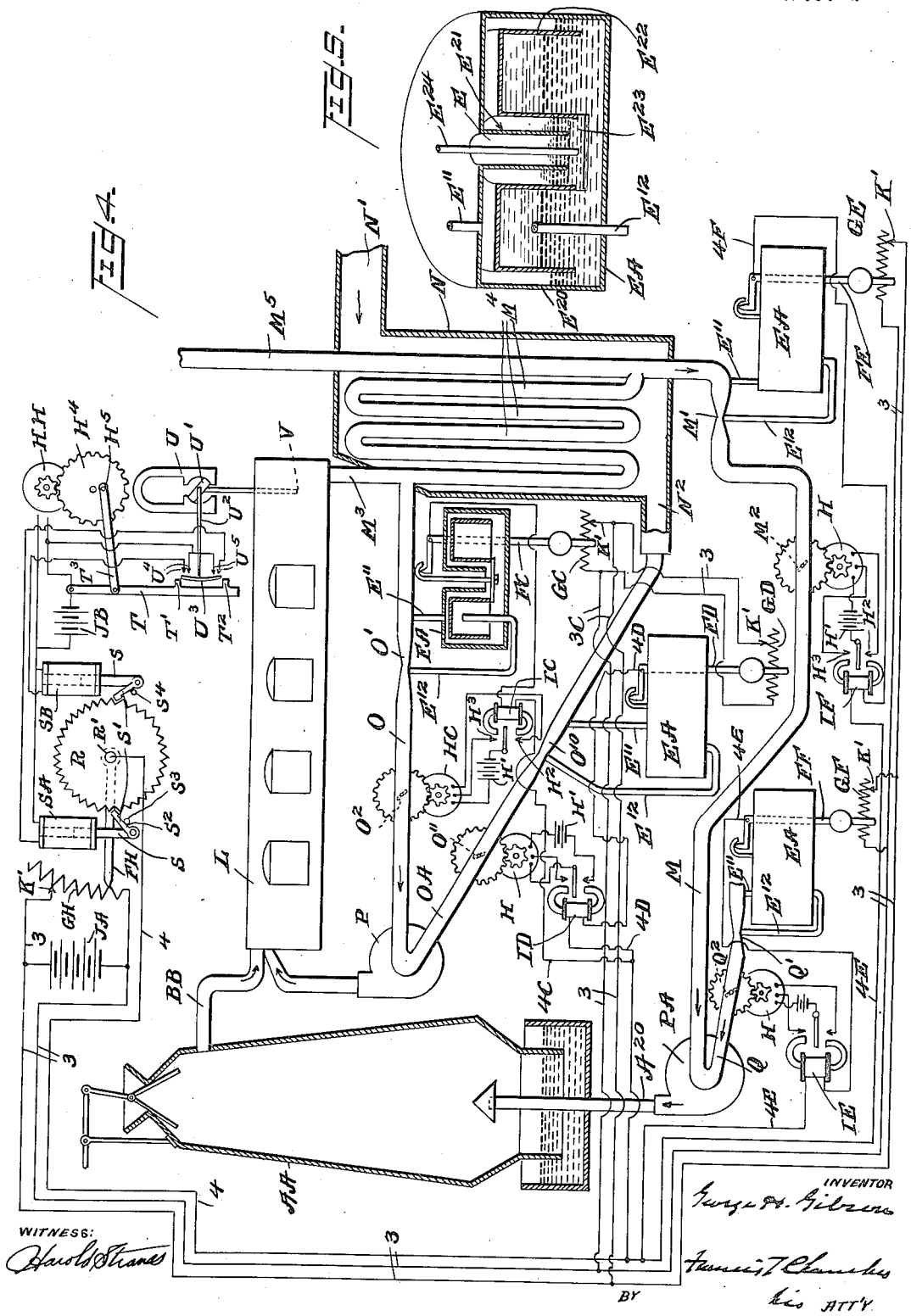

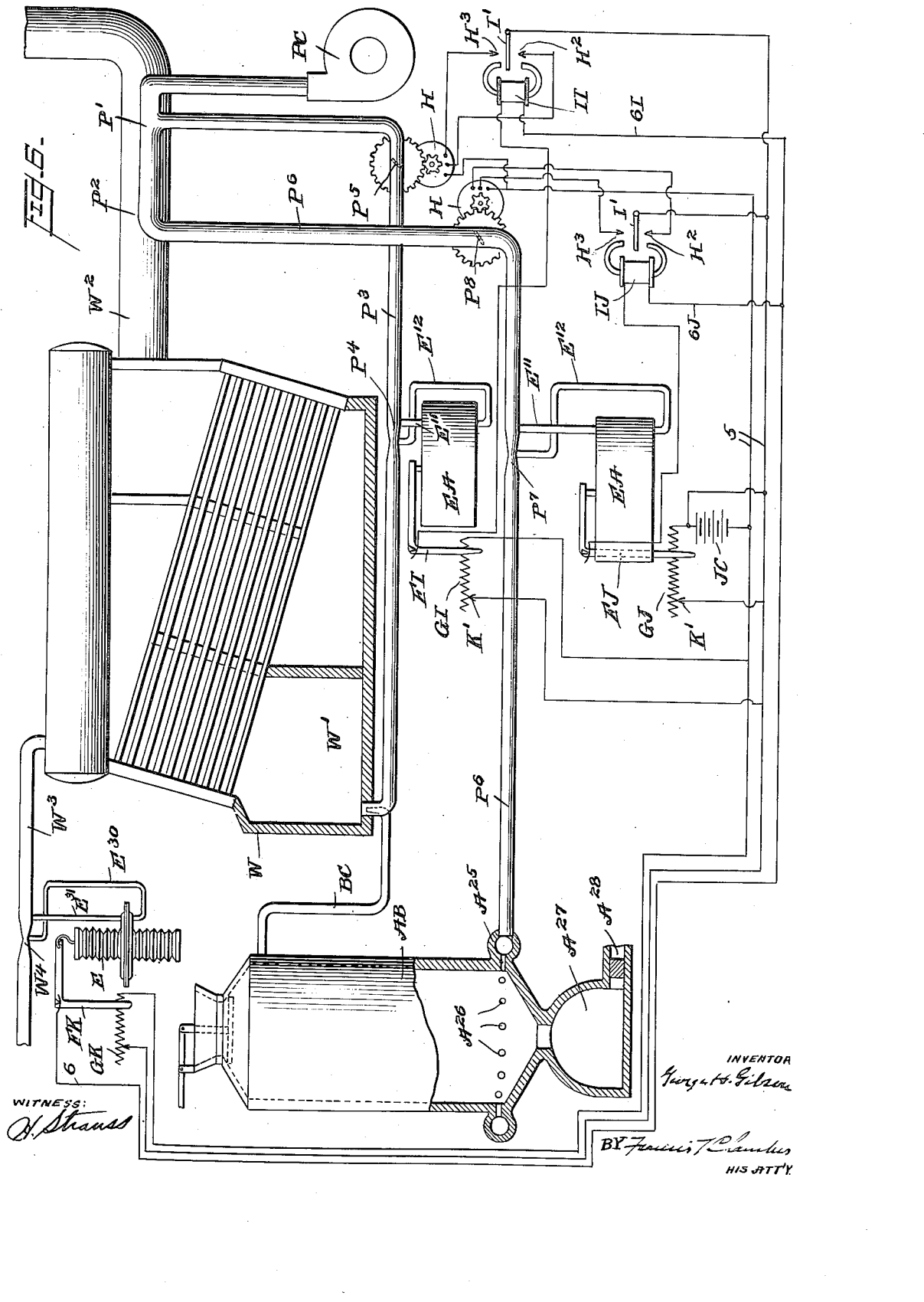

Patented Jan. 20, 1925.

1,523,414

UNITED STATES PATENT OFFICE.

GEORGE H. GIBSON, OF MONTCLAIR, NEW JERSEY.

COMBUSTION CONTROL FOR GAS PRODUCERS.

REISSUED

Application filed May 28, 1917. Serial No. 171,401. Renewed June 2, 1924.

*To all whom it may concern:*

Be it known that I, GEORGE H. GIBSON, a citizen of the United States of America, residing in Montclair, in the county of Essex and State of New Jersey, have invented certain new and useful Improvements in Combustion Controls for Gas Producers, of which the following is a true and exact description, reference being had to the accompanying drawings, which form a part thereof.

A primary object of my present invention is to provide improved means for regulating the operation of a gas producer in which a diluent, such as steam or products of combustion, as well as primary air are supplied to the producer. Another primary object of the invention is to provide improved means for regulating combustion apparatus comprising a gas producer, and a separate combustion furnace in which the gas generated in the producer is added to and burned with the proper amount of secondary air which may or may not be mixed with a diluent; and a third primary object of the invention is to provide improved means for automatically maintaining predetermined ratios between fluid rates of flow which are well adapted for use in automatically proportioning the primary air and diluent in attaining the first mentioned object of my invention, and for use in proportioning the gas generated by the producer and the secondary air for its combustion in attaining the second mentioned primary object of my invention.

The various features of novelty which characterize my invention are pointed out with particularity in the claims annexed to and forming part of this specification. For a better understanding of the invention, its operating advantages, and specific objects obtained by its use, reference should be had to the accompanying drawings and descriptive matter, in which I have illustrated and described preferred embodiments of my invention.

Of the drawings.

Figure 1 is a diagrammatic representation of a gas producer provided with one form of my improved regulating means.

Figure 2 is a simplified diagram of certain electrical connections and arrangements employed in the apparatus shown on Fig. 1.

Figure 3 is a sectional elevation of a differential pressure device employed in Figure 1.

Figure 4 is a diagrammatic representation of a plant comprising a gas producer and a furnace heated with the gas generated thereby.

Figure 5 is a sectional elevation of a differential pressure device employed in the plant shown in Fig. 4.

Figure 6 is a diagrammatic representation of a power plant comprising a gas producer and a steam generating boiler heated by the gas generated in the producer.

In the drawings, and referring first to the apparatus shown in Figs. 1, 2 and 3, A represents a gas producer of conventional type, having the usual charging provisions at its upper end, and open at its lower end to permit air to pass into the charge through the grate $A^4$. The finished gas is withdrawn from an intermediate zone of the producer to an annular chamber $A'$ surrounding the producer and connected to the service main B. The rich gas given off by the freshly charged fuel at the top of the producer leaves the latter through the outlet $A^3$ and passes through the conduit C to the inlet $A^2$, through which it is returned to the lower end of the producer above the grate $A^4$. Steam supplied by the pipe D, which terminates in a restricted discharge nozzle $D'$, is also blown into the lower end of the producer through inlet $A^2$. The jet of steam thus supplied provides the necessary draft for withdrawing the rich gas from the top of the producer through the outlet $A^3$ and conduit C, and also insures a temperature in the fuel bed below the fusing point of the ash. By causing the rich gas given off at the top of the producer to be passed through the fuel bed again in this manner the tars and vapors contained in the rich gas are broken up and converted into permanent gases, and in consequence the gas withdrawn from the producer through the service main B is composed almost entirely of fixed permanent gases suitable for use in a gas engine or for similar purposes.

Associated with the producer shown in Fig. 1 are means for automatically proportioning the amount of rich gas withdrawn from the top of the producer, the amount of primary air supplied to the bottom of the producer, and the amount of steam supplied by the steam jet D, each to the amount of gas withdrawn through the service main B, so as to maintain predetermined ratios between each pair of these four different fluid streams as the amount of gas withdrawn from the producer through the main B varies. The means which I employ for this purpose comprise a flow measuring device for measuring the amount of gas withdrawn through the main B; a flow measuring device for measuring the flow of rich gases through the conduit C; a flow measuring device for measuring the steam flow through the conduit D; a device for regulating the flow through the conduit C; a device for regulating the flow of steam through the conduit D, and means by which the various flow measuring devices actuate the two flow regulating devices to maintain the flows controlled respectively by the latter each in a predetermined ratio to the flow of gas through the main B. The regulating means specified so regulate the draft through the producer as to make the amount of primary air drawn into the lower end of the producer through the grate $A^4$ proportional to the gas outflow through the pipe B.

The flow measuring device employed for measuring the flow through the conduit B comprises a Venturi tube section B' in the conduit B, and a differential pressure responsive device E, having two chambers $e$ and $e'$ separated by a diaphragm $E^2$. To the center of the diaphragm $E^2$ is secured an operating stem $E^3$. This stem extends in opposite directions from the diaphragm and passes through apertures formed in the walls of the rigid portion of the casing. An extensible bellows $E^4$ is connected to the rigid casing at the margin of each aperture, and is closed at its outer end by a head through which the corresponding portion of the stem $E^3$ passes and to which the latter is rigidly secured, thus making stuffing boxes unnecessary.

The chamber $e$ is connected to a high pressure point of the Venturi tube section B' by a pipe $E^5$, and the chamber $e'$ is connected to the low pressure point of the section by a pipe $E^6$. The upper end of the stem $E^3$ is connected to a regulating switch member F. As shown, the regulating member F is in the form of a bell crank lever, pivoted at F'. One arm of the member F is a switch arm which is arranged to sweep over an electrical resistance G, and is provided with an adjustible counter weight $F^2$ for varying the force which must be exerted on the diaphragm $E^2$ to produce a particular movement of the depending arm of the member F over the resistance G.

The device for measuring the flow through the conduit C comprises a Venturi tube section C' in the latter, and a differential pressure device E having its two chambers connected by the pipes $E^7$ and $E^8$ to the high and low pressure points of the Venturi tube section. This differential pressure device is employed to adjust a regulating switch element FA sweeping over a resistance GA generally similar to the regulating member F and resistance G, respectively.

The means for measuring the steam flow through the conduit D comprises a differential pressure device E, having its chamber $e$ connected by a conduit $E^9$ to the conduit D and having its chamber $e'$ connected by a conduit $E^{10}$ to the outer end of the producer inlet $A^2$. The differential of the pressure transmitted through the pipes $E^9$ and $E^{10}$ to the two chambers of the corresponding differential device E is a function of the steam discharge through the nozzle D'. This differential pressure device adjusts a switch arm FB, working along a resistance GB, and generally similar respectively to element F and resistance G.

The flow through the conduit C is regulated by a damper $C^2$, which is adjusted by means of an intermittently actuated reversible electric motor H. The latter is energized by a source of current H', having one terminal connected to one terminal of the motor and the other terminal connected to a circuit closing device I', which, as illustrated, is formed by, or carried on the armature I' of a polarized relay IA. When the latter is energized by a current flow through its winding in one direction the armature I' is raised and thereby connects the current source H' to a terminal contact $H^3$ of the motor H. On a reverse current flow through the winding of the relay IA, the armature I' is depressed and the current source H' is connected by the armature I' to another motor contact $H^2$. When the current source H' is operatively connected to the motor through the contact $H^3$ the motor H operates in the direction required to close the damper $C^2$ and thereby reduces the flow through the conduit C. When the current source H' is operatively connected to the motor through the contact $H^2$, the motor H operates in a direction to open the damper $C^2$ and thereby permits an increased flow through the conduit C.

The flow through the conduit D is controlled by a damper $D^2$, adjusted by a motor H controlled by a polarized relay IB through means similar to those by which the relay IA controls the motor H for regulating the damper $C^2$.

Circuit connection 1 connects the resistance elements G, GA and GB in multiple to a source of current J, as shown most clearly in Fig. 2. Advantageously the multiple circuits connecting the resistances G, GA and GB with the current source J include manually adjustable resistance K, KA and KB respectively. The switch arm F is connected by conductor 2 and branch conductors $2^A$ and $2^B$ respectively to the switch arms FA and FB. The branch conductor $2^A$ includes the winding of the polarized relay IA, and the branch conductor $2^B$ includes the winding of the polarized relay IB.

With the construction described the position of the switch arm F depends upon the difference in pressure between the high and low pressure points of the Venturi section, and this pressure differential is some function of fluid rate of flow through the conduit B. No matter what the flow law governing the flow through the conduit B may be, it is possible to make such a disposition of the various portions of the resistance conductor G along the path of the switch arm F that the ratio of the portion of the resistance G at one side of the switch arm F to the portion at the other side of the arm may be made to vary with any desired function of the varying rate of flow through the conduit B, and in particular it can be made to vary in linear proportion to the rate of flow through the conduit. The electrical potential difference between the switch arm F and either terminal of the current source J may thus be made proportional to the current flow through the conduit B. Similarly the potentials of the switch arms FA and FB may be made lineally proportional, respectively, to the rates of flow through the conduits C and D regardless of whether the flow laws governing the flow through these conduits are the same as or different from those governing the flow through the conduit B.

When the three switch arms F, FA and FB are all at the same potential no current will flow through either of the polarized relays IA and IB, but if the switch arm FA differs in potential from either of the switch arms F and FB a current will flow through the branch conductor $2^A$. This will energize the relay AI in one direction or the other, according to the direction of the current flow, and the parts are so arranged that the consequent energization of the motor H regulating the damper $C^2$, will adjust the latter to increase or decrease the flow through conduit C as may be required to thereby move the switch arm FA in the direction necessary to make the potential of the switch arm FA the same as that of the switch arms F and FB. Similarly a difference between the potential of the switch arm FB and the potential of either switch arm F or FA will result in a current flow through the conductor $2^B$, energizing the polarized relay IB in the direction required to effect an adjustment of the damper $D^2$ tending to make the flow in the conduit D such that the potential of the switch arm F will be the same as the potential of the switch arms F and FA.

Those skilled in the art will understand that by adjusting the setting of the counter weights $F^2$ and the manually adjustable resistances K, KA and KB, coupled with a suitable disposition of the various resistance conductors G, GA and GB, the ratio of the flow of the steam, rich gas or primary air to the flow of gas through the conduit B may, for any given rate of flow through the latter, be made of any desired value, within limits, and these ratios may be kept constant or varied as the rate of flow through the conduit B varies.

The means employed in the apparatus shown in Figs. 1, 2 and 3 to maintain predetermined ratios between different fluid rates of flow may be called potentiometer means, inasmuch as the flow regulating means proper are responsive to differences in potentials between particular points (determined by the flow measuring devices) of the resistances G, GA and GB, which may be called the potentiometer resistances. This potentiometer means is comparatively simple and may readily be made highly sensitive, accurate and reliable since the various potentiometer resistances are connected in multiple to a single source of current. The operation of the proportioning means is independent of the actual voltage of the source of current, and is not affected by variations in that voltage.

Furthermore the operation of the flow proportioning apparatus is independent, within practical limits, of the resistance in the circuits including relays IA and IB, and hence does not depend upon the character of the contacts which the various switches F, FA, and FB make with the corresponding potentiometer resistances G, GA and GB respectively. All that is necessary is that the contacts be good enough to pass some current when a difference in potential exists. The relays IA and IB may be so wound that only a very minute current flow is required to make them effective to set in action the more powerful electric motors H or other motors which may be employed to actuate the different flow regulating devices. The ease with which the potentiometer resistances may be disposed to obtain a predetermined potential variation in response to the particular rates of flow through the corresponding conduits makes the potentiometer means of proportioning readily applicable to use with fluids and flow measuring devices differing widely in character.

The mode of operating a gas producer made possible by the use of the apparatus shown in Figs. 1, 2 and 3 is highly desirable for certain conditions of use. For one thing it insures a generation of gas as required with an efficient utilization of fuel. The use of a steam diluent proportioned to the amount of rich gas not only insures the proper draft and fuel bed temperature, but also assists in securing a uniform breaking up of the non-permanent and vapor constituents of the rich gas into permanent gases suitable for use in a gas engine or the like.

In the embodiment of my invention, illustrated in Figs. 4 and 5, the gas generated in the producer AA is withdrawn from the latter through the conduit BB connected to the upper end of the producer AA, and is delivered to the gas inlet of an industrial furnace such as a reheating furnace L. At the gas inlet of the furnace L the gas supplied by the conduit BB is mixed with air supplied by the blower P, and drawn into the latter through the conduit OA. The air thus drawn into the blower P is mixed in the latter with a portion of the products of combustion issuing from the furnace L through the conduit $M^3$, the latter being connected to the inlet of the blower P by a conduit O. The portion of the products of combustion issuing through the conduit $M^3$, and not returned to furnace L, through the conduit O, passes into the looped conduit $M^4$, disposed within and forming a part of an air preheating device N. The latter has an inlet $N'$, which may be open to the atmosphere and an outlet $N^2$, to which the conduit OA is connected. The primary air supplied to the furnace through the conduit OA and blower P is thus preheated by the products of combustion in its passage through the preheater N. The looped conduit $M^4$ discharges into the chimney connection $M^5$. A portion of the gaseous products of combustion thus passing to the chimney connection $M^5$, is withdrawn from the latter through the conduit M, which is connected to the inlet of a blower PA, which also draws in cold atmospheric air through the conduit Q, and delivers the mixture of cold air and cooled products of combustion to the primary air supply pipe $A^{20}$ of the producer AA.

The apparatus shown in Fig. 4 comprises means for maintaining a predetermined relation between each of the fluid rates of flow through the conduits O, OA, M and Q and the temperature of the products of combustion adjacent the outlet for the latter from the furnace L. The means employed for this purpose comprise pyrometric means including, as shown, a thermo-couple located at the appropriate point in the furnace L, and comprises a flow measuring and flow regulating device for each of the conduits in which the flow is regulated, and comprise electrical means by which each flow regulating device is jointly controlled by the pyrometer V and the corresponding measuring device.

The conduits O. OA, M and Q include Venturi tube sections $O'$, $O^{10}$, $M'$ and $Q'$ respectively, and associated with each of these sections is a differential pressure device EA of the construction illustrated in Fig. 5. The device EA comprises a casing $E^{20}$ closed, except for a central aperture in its upper wall. A tubular element $E^{21}$ projects downward into the casing to which its upper end is connected at the margin of the aperture in the upper wall of the casing. Located in the casing and telescoping with the tubular element $E^{21}$ is a hollow annular floating member $E^{22}$ open at its lower end. A stem or operating rod $E^{24}$ passes into the casing $E^{20}$ through the open ended tubular element $E^{21}$, and is connected to the annular member $E^{22}$ by a cross bar $E^{23}$, which projects across the lower end of, but does not close the central passage through the annular member $E^{22}$. A conduit $E''$ leads from the upper portion of the member $E^{20}$ to the high pressure point of the corresponding Venturi tube section, and a conduit $E^{12}$ leading from the low pressure point of the corresponding Venturi tube section passes into the chamber $E^{20}$ through the bottom wall of the latter and projects up into the upper portion of the annular space within the member $E^{22}$. Water, or other sealing liquid, partially fills the casing $E^{20}$ and closes communication between the space in the latter above the liquid level, and the interior of the member $E^{22}$, and the passageway out of the casing through the tubular member $E^{21}$. Those skilled in the art will understand that this form of differential pressure device is a very sensitive and reliable one.

Associated with each of the conduits O, OA, M and Q is a potentiometer resistance GC, GD, GE and GF respectively. Cooperating with the resistance conductors GC, GD, GE and GF are regulating switch members FC, FD, FE and FF respectively, each of which may be similar in construction to the switch member F, first described, and is connected to the operating stem $E^{24}$ of the corresponding differential pressure device EA as the switch member F is connected to the stem $E^3$ of the differential pressure device E in Fig. 1.

The various resistance conductors GC, GD, GE and GF are connected in multiple with a source of current JA by conductors 3. Separate manually adjustable resistances analogous to the resistances K, KA and KB of Fig. 1 are dispensed with in Fig. 4, and in lieu thereof an adjustable connection $K'$ is made to one side of each of the resistances GC, GD, GE and GF. A potentiometer resistance conductor GH, one of the terminals $K'$ of which is adjustable, is also connected to the source of current JA in multiple with the other potentiometer resistances. Cooperating with the resistance GH is a switch arm FH which is connected to and turns with a ratchet wheel R journaled at R'. The angular position of the ratchet wheel R and switch arm FH is adjusted on variations in the temperature to which the thermo-couple is subjected by an electromagnetic motor comprising a pair of solenoid coils SA and SB, arranged at opposite sides of the ratchet wheel. Each of the coils SA and SB is provided with an armature S. Pivotally connected to the lower end of the armature S of the coils SA is a pawl S', which when the coil SA is deenergized engages a stop $S^3$, and is thereby held out of engagement with the teeth of the ratchet wheel R, but when the coil SA is energized and its armature S is raised the pawl S' engages one of the teeth of the ratchet wheel R and gives the latter a slight angular movement in the clockwise direction. Similarly the armature S of the coil SB carries a pawl S', which engages a stop $S^4$ and is thereby held out of engagement with the ratchet wheel R when the coil SB is deenergized, but when the latter is energized, engages one of the teeth of the ratchet wheel and gives the latter a small angular movement in the counter clockwise direction.

The energization of the coils SA and SB is intermittently effected when necessary by the following means: The movable coil U' of the electrical instrument U, to which the terminals of the thermo-couple V are connected supports an arm $U^2$ carrying at its free end a transverse flexible contact device $U^3$, which normally lies between a pair of lugs T' and $T^2$, carried by a lever T. The latter is oscillated by a continuously operating electric motor HH, and a gear wheel $H^4$ rotated by the motor and connected to the lever T by a crank pin $H^5$ and connecting rod $T^3$. As the lever T approaches the instrument U in each of its oscillatory movements, one or the other of the lugs T' and $T^2$ engage the corresponding end of the flexible contact member $U^3$ and forces the latter into engagement with the corresponding pair of contacts $U^4$ or $U^5$ in case the pointer arm $U^2$ is deflected up or down respectively from the neutral position illustrated in Fig. 4. When the arm $U^2$ is in a neutral position the lugs T', $T^2$ clear both ends of the contact piece $U^3$. One of the contacts $U^4$ is connected to one terminal of the coil SB, and one of the contacts $U^5$ is connected to one terminal of the coil SA. The other terminals of the coils GA and SB are connected to one side of a source of current JB, and the other side of the source of current JB is connected to the second contact $U^4$ and to the second contact $U^5$. The source of current JB also energizes the motor HH.

The switch arm FH is connected by a conductor 4 and branch conductors $4^C$, $4^D$ and $4^F$ to the switch members FC, FE and FF respectively. The conductor $4^C$ includes the winding of a polarized relay IC, which controls a motor HC for adjusting a damper $O^2$ in the conduit O exactly as the damper $C^2$ is controlled by the relay IA in the apparatus shown in Fig. 1, and the conductors $4^D$, $4^E$ and $4^F$ include the windings of relays ID, IE and IF, respectively which similarly control dampers $O^{11}$, $M^2$ and $Q^2$ in the conduits OA, M and Q respectively.

The apparatus shown in Fig. 4 is intended to maintain a constant temperature at the point in the reheating furnace L at which the thermo-couple V is located. So long as this temperature does not vary from the predetermined normal amount, the pointer arm $U^2$ of the instrument U will remain in its neutral position in which the oscillations of the lever T will not result in energizing either of the solenoid coils SA and SB. When the temperature rises above the normal, pointer $U^3$ will be shifted in the clockwise direction, and when thereafter the lever T next approaches the instrument U, the coils SB will be momentarily energized and the ratchet wheel R thereby displaced from its normal position by a small angular movement in the counter clockwise direction. This will shift the lever FH and correspondingly vary the potential of the latter. The variation in potential of the lever FH thus produced will result in a current flow through the relays IC, ID and IF in a direction tending to cause a closing movement of the various dampers $O^2$, $O^{11}$, $M^2$ and $Q^2$, and thereby reduce the amount of gas generated in the producer AA, and the amount of heat generated in the furnace L by the combustion therein of the gas so produced. In case this initial adjustment is not sufficient to reduce the temperature in the furnace L to normal, a succeeding oscillatory movement of the lever T toward the instrument U will again energize the coil SB and cause a further angular adjustment of the ratchet wheel R in a clockwise direction and a consequent further throttling adjustment of the various dampers $O^2$, $O^{11}$, $M^2$ and $Q^2$. These throttling adjustments will be continued until the temperature of the thermo-couple V is returned to the predetermined normal value, whereupon the pointer arm $U^2$ and the contact $U^3$ carried thereby return to their neutral positions. Should the temperature of the thermo-couple V fall below normal the corresponding displacement of the pointer arm $U^2$ and contact piece $U^3$ will result in the energization of the solenoid coil SA one or more times and a corresponding angular adjustment or adjustments of the ratchet wheel R in a counter clockwise direction. The change in potential of the switch arm FH thus produced will result in current flows through the relays IC, IB and IF necessary to produce opening adjustments of the dampers O², O¹¹, M² and Q², and thereby increase the amount of gas generated in the producer AA and burned in the furnace L until the temperature thermocouple V again becomes normal.

It will be understood without further explanation that the flow measuring and controlling means associated with the conduits M and Q will maintain at all times the desired relative proportions between the primary air supplied through the conduit Q, and the diluent supplied through the conduit M and passed by the blower PA into the lower end of the gas producer AA. The flow measuring and controlling devices associated with the conduits O and OA similarly maintain the desired ratio between the amounts of preheated air supplied by the conduit OA and the heated diluent supplied by the conduit O to the blower P and passed by the latter to the furnace L. Since the gas generated in the producer is proportioned to the air and diluent supplied to the producer, the instrumentalities described will maintain the desired ratio between the gas passed to the furnace L from the producer through the conduit BB, and the mixture of air and diluent passed to the furnace through the blower P. The addition of the diluent to the air supplied to the furnace L through the blower P elongates the combustion flame in the furnace and tends to produce an equality of temperature in the furnace. The normal temperature maintained in the furnace L may be adjusted when desired by adjusting the pointer arm U³ with relation to the movable coil U' of the instrument U.

In Figure 6 I have illustrated the use of my invention to control the operation of a steam plant comprising a steam generating furnace W, heated by the combustion of gas generated in a producer AB from which the gas generated passes through a conduit BC to the combustion chamber W' of the steam generating furnace, where it is admixed by air supplied by a conduit P³, the draft being created by a blower PC. The air thus passing to the combustion chamber W' is preheated by passing through one section P' of the preheater located in the products of combustion outlet W² from the furnace W. Only a portion of the air passing through the preheater section P' is delivered to the conduit P³. The remainder of the air preheated in the section P' passes through a second preheating section P² and is further preheated therein and is delivered to a conduit P⁶, which supplies primary air to the lower end of the producer AB. This air is admitted to the producer through twyers A²⁶ opening from a bustle chamber A²⁵ surrounding the producer and into which the conduit P⁶ discharges. By the use of primary air thus preheated the ash formed in the producer may be caused to fuse and flow out of the bottom of the producer proper into the ash pit A²⁷, from which it may be removed from time to time through the normally closed outlet A²⁸.

The conduit P³ includes a Venturi section P⁴, associated with which is a differential pressure device EA connected with a regulating switch FI, working over a potentiometer resistance GI. The flow through the conduit P³ is controlled by a damper P⁵, which is adjusted by a motor H, the operation of the latter being controlled in turn by a polarized relay II. Similarly the conduit P⁶ includes a Venturi section P⁷ associated with which is a differential pressure device EA, controlling a regulating switch FJ working over a potentiometer resistance GJ. The flow through the conduit P⁶ is regulated by a damper P⁸ adjusted by a motor H, controlled by a polarized relay IJ. The steam outlet pipe W³ from the steam generating furnace W includes a Venturi tube section W⁴, associated with which is a differential pressure device E which adjusts a regulating switch FK working over a potentiometer resistance GK. The various resistances GI, GJ and GK are connected in multiple to a source of current JC by conductors 5, and in this form of my invention the source of current JC also supplies the current for energizing the damper actuating motors H. The switch member FK is connected by the conductor 6 and the branch conductors 6ᴵ and 6ᴶ to the regulating switch members FI and FJ, respectively. The conductor 6ᴵ includes the winding of the polarized relay II, and the branch conductor 6ᴶ includes the winding of the polarized relay IJ.

It will be apparent without further explanation that the apparatus shown in Fig. 6 comprises means for proportioning the amount of air supplied to the producer AB and the amount of air supplied to the combustion chamber W' each to the amount of steam withdrawn from the boiler through the steam pipe W³. The producer gas fired, steam generating plant shown in Fig. 6, with its highly efficient automatic control provisions possesses special operating advantages in that it is possible to locate the steam generating furnace adjacent the turbines or other steam utilizing devices supplied, and to locate the producer at some more remote and convenient place. The efficiency of the steam generating furnace is enhanced by the fact that the character of the combustion minimizes the accumulation of dust or other foreign material on the boiler tubes.

Those skilled in the art will recognize that the flow proportioning means employed with all the forms of apparatus disclosed herein are essentially simple and reliable. The different flow proportioning instrumentalities are comparatively simple, compact and reliable and are of the character to permit their ready installation in connection with existing flow systems as well as in new plants.

While in accordance with the provisions of the statutes I have illustrated and described the best forms of my invention now known to me, those skilled in the art will understand that changes may be made in the form of the apparatus disclosed herein without departing from the spirit of the invention covered by my claims and that certain features of my invention may sometimes be used to advantage without a corresponding use of other features.

Having now described my invention, what I claim as new and desire to secure by Letters Patent, is:

1. In combination a gas producer having an air inlet, a gas outlet and a fuel bed interposed between said inlet and outlet, a separate combustion furnace, to which gas issuing from said producer through said outlet is passed, an air inlet to said furnace and means for automatically proportioning the air supplied to the air inlet of the producer to the air supplied to the air inlet of said furnace.

2. In combination a gas producer having an air inlet and a gas outlet and a fuel bed interposed between said inlet and outlet, a separate combustion furnace to which gas issuing from said producer through said outlet is passed, an air inlet to said furnace, means responsive to the rate of air flow through the air inlet to said furnace, means responsive to the rate of air flow through the air inlet to said producer, and means jointly controlled by said flow responsive means for proportioning the air supplied to the air inlet of the producer to the air supplied to the air inlet of said furnace.

3. Means for maintaining a desired ratio between two fluid rates of flow in two conduits, comprising in combination a means responsive to the fluid rate of flow in each of said conduits, a potentiometer resistance associated with each conduit, means for causing a current flow through each of said resistances, a switch member contacting with each resistance and automatically adjusted by the corresponding flow responsive means, an electrical connection between said switch members, and means actuated by current flow through such connection for adjusting the flow through one of said conduits.

4. Means for maintaining a desired ratio between two fluid rates of flow through two conduits, comprising in combination a means responsive to the fluid rate of flow in each of said conduits, a potentiometer resistance associated with each conduit, a common source of current supplying current to each of said resistances, a switch member contacting with each resistance and automatically adjusted by the corresponding flow responsive means, an electrical connection between said switch members and means actuated by current flow through such connection for adjusting the flow through one of said conduits.

5. In combination, a gas producer, air supplying means therefor, means supplying a diluent fluid to said producer, and means responsive to the amounts of air and diluent supplied for automatically proportioning the air and diluent so supplied.

6. In combination a gas producer, a plurality of gaseous supply means therefor and means responsive to the amounts of gaseous fluids supplied by each for automatically proportioning the gaseous flows, one to the other, in fixed ratios, irrespective of the absolute magnitudes of the rates of flow.

7. In combination a gas producer and outlet connection therefrom, a plurality of inlet connections thereto and means responsive to the rates of flow through the respective connections whereby the rates of flow through said inlet and outlet connections are automatically proportioned in fixed ratios.

8. In combination a gas producer, a plurality of gaseous supply means therefor, a gas utilizing device, means responsive to the rates of supply and means responsive to the operation of the gas utilizing device, and means controlled by the two last mentioned means for regulating the gaseous supplies to the producer in fixed proportions to one another, and in amount according to the requirements of the utilizing device.

9. In combination a gas producer, a furnace receiving gas therefrom through a supply connection, air supply connections to the producer and to the furnace, means responsive to the rates of flow in the respective connections, means responsive to the temperature in the furnace, and means controlled by the two last mentioned means for automatically controlling the respective rates of flow concurrently according to the temperature in the furnace.

10. The combination with a pair of conduits, of a separate deflecting element associated with each conduit and deflected by a fluid flow through the conduit in proportion to a function of the rate of said flow, and means jointly controlled by the two deflecting elements for adjusting the flow in one conduit so as to preserve a predetermined relation between the deflections of the two deflecting elements.

11. The combination with a pair of conduits, of a separate deflecting element associated with each conduit and deflected by a fluid flow through the conduit in proportion to a function of the rate of said flow, and electromagnetic means jointly controlled by the two deflecting elements for adjusting the flow in one of the conduits as required to maintain a predetermined relation between the fluid rates of flow in the two conduits.

12. The combination with a pair of conduits, of a separate differential pressure gage including a deflecting element for each conduit so associated therewith that the deflection of said element will be proportional to a function of the rate of fluid flow through the conduit, and means jointly controlled by the two deflecting elements for adjusting the flow in one conduit as required to maintain a predetermined relation between the rates of flow in the two conduits.

GEORGE H. GIBSON.